(12) United States Patent
Bull et al.

(10) Patent No.: US 8,185,791 B2
(45) Date of Patent: May 22, 2012

(54) PROVIDING TUNING LIMITS FOR OPERATIONAL PARAMETERS IN DATA PROCESSING APPARATUS

(75) Inventors: David Michael Bull, Balsham (GB); Shidhartha Das, Cambridge (GB)

(73) Assignee: ARM Limited, Cambridge (GB)

( * ) Notice: Subject to any disclaimer, the term of this patent is extended or adjusted under 35 U.S.C. 154(b) by 246 days.

(21) Appl. No.: 12/453,835

(22) Filed: May 22, 2009

(65) Prior Publication Data

US 2010/0299557 A1 Nov. 25, 2010

(51) Int. Cl.
*G01R 31/28* (2006.01)
(52) U.S. Cl. ........................................ 714/745
(58) Field of Classification Search .................. 714/745
See application file for complete search history.

(56) References Cited

U.S. PATENT DOCUMENTS

| | | | | |
|---|---|---|---|---|
| 6,370,200 | B1 * | 4/2002 | Takahashi | 375/257 |
| 6,636,999 | B1 * | 10/2003 | Yamada | 714/744 |
| 6,996,032 | B2 * | 2/2006 | Ganry | 368/118 |

* cited by examiner

*Primary Examiner* — James C Kerveros
(74) *Attorney, Agent, or Firm* — Nixon & Vanderhye P.C.

(57) ABSTRACT

Tuning limits are set for operational parameters in a processing stage within a data processing apparatus for processing a signal and outputting it at an output time. If a signal output between the output time and a predetermined time later does not have a stable value, the predetermined time later being before a next output time, an error is signaled. A tuning circuit adjusts an operational parameter of the processing stage in accordance with a tuning limit. A signal passing along a critical path of the processing stage tuned to the tuning limit is expected to reach the output of the processing stage at a preset time later than the output time, the preset time being less than the predetermined time.

16 Claims, 9 Drawing Sheets

PROVIDING TUNING LIMITS FOR OPERATIONAL PARAMETERS IN DATA PROCESSING APPARATUS

This application claims the benefit of U.S. Provisional Application No. 61/108,916, filed Oct. 28, 2008, the entire content of which is hereby incorporated by reference.

TECHNICAL FIELD

The technology field relates to data processing apparatus, and in particular, to tuning operational parameters of data processing apparatus.

BACKGROUND

In order to improve the power consumption and operational performance of a microelectronic system, systems have been developed than can be tuned to respond to current conditions and can thus, reduce their operational voltage at times of low utilisation to reduce their power consumption, and/or can increase their clocking frequency when critical code is not being executed to increase their speed.

If the operational voltage is reduced by too much or the clocking speed is increased by too much then errors can occur, in that a signal may not reach the output of the processing stage during the required clock cycle(s) and thus, the previous value is output rather than the current value. In order to prevent a system from being over tuned by reducing the voltage and/or increasing the clocking speed by too much devices have used adaptive techniques that use delay-chains to imitate a processor's critical-path to determine a tuning limit for the processor. By sending a signal along the imitation critical path a voltage and frequency can be determined that are sufficient for the signal to be transmitted within a clock cycle. In order to account for inter-die variations and local voltage and temperature fluctuations the imitation or replica critical path delay is over engineered. Thus, in the example shown in FIG. 1, the critical path delay is estimated as being equivalent to the delay of 11 inverters and therefore a replica delay-chain of 13 inverters is used to account for the local variations. This replica path is used to ensure that voltage and frequency values are selected that allow a signal to travel the length of this path within a clock cycle. If the values are varied so that this is no longer the case, then the system is no longer safe and values for frequency and voltage are selected to avoid this. Thus, in order to avoid errors a clocking frequency that is slightly lower and/or an operational voltage that is slightly higher than would usually be required are chosen.

Another known way of tuning a system to reduce the voltage level and/or increase the clocking frequency as required is a razor-based system produced by ARM® Limited of Cambridge England. This is a system that is designed to operate at a point beyond this estimated absolute safe limit, the system having an error detection and recovery means to recover from cases where the signal does not reach the output in time. This system has a speculation region at the end of the clock cycle during which the output signal is measured to see if it is stable. Thus, provided any output signal attains its final value within this region, this will be detected, and if this final value is not the value at the end of the clock cycle, this can be determined and corrected. As it has this error detecting and correcting capability, the system does not need to put safety margins into the clock frequency and operational voltage. In effect it can tune its operational voltage and/or frequency to be in a range where errors are unlikely but may occur. It does this by tuning these operational parameters in dependence upon a detected error rate received from the error detection circuitry and it changes the parameters to keep this error rate at a desired low value, where it calculates its optimal operating point to be.

However, a problem arises if the error-rate drops to a very low rate due, for example, to a processor's critical paths not currently being used. This can lead to the operational voltage being scaled down and/or the frequency being increased to such levels that when the processor resumes executing critical code, it experiences significant slow-down due to very high error rates initially. In the worst case these parameters may be scaled to such an extent that the errors occur beyond the error detection or speculation window, which means they can no longer be detected or recovered from and this therefore leads to system failure.

SUMMARY

A first aspect provides a processing stage within a data processing apparatus for processing a signal, said processing stage comprising: an input for receiving said signal, processing circuitry for processing said signal and an output for outputting said processed signal at an output time; an error detecting circuit for determining if a signal output by said processing stage between said output time and a predetermined time later does not have a stable value, said predetermined time later being before a next output time, and for signalling an error if said signal is not stable; a tuning circuit for adjusting at least one operational parameter of said processing stage; a tuning limiting circuit for providing at least one tuning limit for said tuning circuit, such that said at least one operational parameter is not adjusted beyond said corresponding at least one tuning limit, said tuning limiting circuit being configured to provide said at least one tuning limit such that a signal passing along a critical path of said processing stage tuned to said tuning limit is estimated to reach said output of said processing stage at a preset time later than said output time, said preset time being less than said predetermined time.

Although safety margins may be necessary when tuning the operational parameters of a system, they lead to inefficiencies as an operation point comfortably within a safety zone is selected to avoid the risk of errors. This operating point may well be far from an optimum operating point. In a razor system, this problem is addressed by having a system that can correct for errors, and this allows the system to be operated at a point where a certain estimated "optimum" error rate is achieved. However, a problem with this is that where critical code is not being executed, relying on error rates to set your operational parameters means that at a point where the error rates are very low, the values will continue to increase/reduce to levels where when critical code is again executed many errors will occur, some of which may be outside the speculation zone and therefore go undetected. These issues are addressed by providing a system where a tuning limit is set which provides a maximum amount that these operational parameters can be tuned to. It does not set the limit in the conventional way to avoid any errors, but rather sets a limit where it estimates that a signal passing along a critical path of the processing stage tuned to this tuning limit will reach the output of the processing stage a preset time later than the output time, the preset time being less than the predetermined time. In other words, the system is being tuned to limits that provide for output times that are later than a first possible point of failure. Signals sent along a critical path are estimated to on average arrive at the output not within the clock cycle but at a preset time later than the clock cycle. In effect a less stringent test is applied for estimating the point of failure, such that the estimated error rate is not zero for signals passing along critical paths in processing stages operating in sub-optimal conditions, or with poor fabrication effects. However, for a good processing stage, operating at optimal temperatures there may be no errors, while for a poorer processing stage there will be errors generated by signals passing along the critical paths. Thus, in this way it provides a limit that is under margined so that when operating at this limit, the system is performing more efficiently than it would when operating at a limit that had been estimated with a safety margin. It is able to do this as it can rely on the error detecting circuit to detect any errors that may result. These errors are detected by an output signal not being stable between an output time and a time a little later. It should be noted that this may mean that the output value changes value during this period or there may be a glitch in the output signal.

In some embodiments, said at least one operational parameter comprises at least one of an operating voltage of said processing stage and an operating frequency of a clock clocking said processing stage and said corresponding tuning limits comprise a lowest limit value for said operating voltage and a highest limit value for said operating frequency.

Although the operational parameters that are tuned can be a number of things, they are often either the operating voltage of the processing stage and/or the operating frequency of a clock clocking the processing stage. Decreasing the operating voltage of a processing stage will clearly decrease the power consumption but will also decrease its performance and thus, depending on whether it is in a high activity mode or not this can be increased appropriately. Similarly, increasing the operating frequency of the clock increases the speed of its performance but this too must be done within limits if errors are to be avoided.

In some embodiments, said tuning limiting circuit comprises a delay chain path for imitating a delay of a critical path of said processing stage and for providing a delay to said signal to be processed by said delay chain that is similar to but is less than an estimated delay of said critical path, said tuning limiting circuit further comprising a comparator circuit for detecting a difference in an output from said delay chain at said output time and an output from said delay chain at said predetermined time later than said output time and in response to detecting a difference in said outputs, to set a tuning limit for said at least one operational parameter.

Providing the tuning limit for the circuit can be done in a number of ways, one way being to provide a replica delay chain. In this case, the delay chain is under margined so that it provides a delay that is estimated to be less than the delay of the critical paths that it is replicating for at least some operating conditions or processing stages. Thus, it provides a limit to the operating parameters that is slightly under margined and allows the system to operate at a point where when critical code is executed errors may result. This is acceptable as the processing stage comprises error detection circuitry.

In some embodiments, in response to detecting said output difference said tuning circuit is configured to adjust said at least one operational parameter to a value that said at least one operational parameter had before said difference was detected and to set said at least one operational parameter as said at least one tuning limit in others it adjust it to the value it had when the difference was detected.

In response to detecting that a signal is not passing through the delay chain within the expected time limits, the operational parameters may be set at that value or back to the value before this error occurs. This depends on the margins that are used for the delay chains and the desired position of operation. It should be noted that the detection of signals passing along the delay chain can be done at the beginning of operation to set a limit for the operational parameters, or alternatively it can be done whenever the operational environment changes or it can be done continuously.

In alternative embodiments, said tuning limiting circuit comprises a register for storing said at least one tuning limit and an input for receiving said tuning limit.

The values for limiting the operational parameters can also be estimated by performing a static analysis of the circuit and setting the values in response to this. These values are then stored within the processing stage. It should be noted that this can be done at manufacture and the values could be hard wired into the system. Alternatively it can be done via a programmer when the actual circuit itself has been tested.

In some embodiments, said tuning circuit further comprises an input for receiving a test program and circuitry for sending said test program to said processing circuitry, processing of said test program causing said signal to pass along a near critical path, said tuning circuit being configured to adjust said at least one operational parameter until said error detecting circuit detects an error, said at least one tuning limit of said at least one operational parameter being set to a value of said at least one operational parameter at a point that an error is detected.

An alternative way of setting the tuning limits can be to run a test program that causes worse case signals to run through the processing logic along paths that are similar to but slightly better than the critical paths. Slightly under margined tuning limits can be detected in this way so that the system is working in a place that it is estimated will be just beyond where errors start to occur. Alternatively, test programs could be used that send signals along critical paths and slightly higher operating frequencies and/or slightly lower voltages than those that produce the first error could be selected as the tuning limits.

In some embodiments, said tuning limiting circuit further comprises a test input for receiving a test pattern and circuitry for transmitting said test pattern to said processing circuitry, said test pattern causing said signal to pass along said a near critical path, said tuning circuit being configured to adjust said at least one operational parameter until said error detecting circuit detects an error, said at least one tuning limit of said at least one operational parameter being set to a value of said at least one operational parameter at a point that an error is detected.

Alternatively, near worst case signals can be run through the system to determine the tuning limits using test patterns of data that are inserted into the processing logic and cause the near critical paths to be activated. In this way paths that are similar to but slightly better than the critical paths of the system can be evaluated and tuning limits that may just cause errors when these paths are used can be selected, to ensure slightly under margined tuning limits. Alternatively, test patterns could be sent along critical paths and slightly higher operating frequencies and/or slightly lower voltages than those that produce the first error could be selected as the tuning limits.

In some embodiments, said tuning limiting circuit comprises a comparator circuit for comparing an output signal at said predetermined time later than said output time with an output signal at a later time than said predetermined time and before a next output time, and for signaling a difference if said two signals are not equal, said tuning limiting circuit being configured to select said at least one tuning limit such that all of said signals processed by said processing stage will have said stable value at said predetermined time.

The system can be designed so that the errors are estimated at the predetermined time later than the output time which is in effect the end of the time where errors are detected. If critical paths are analysed in this way, then it is desirable that the system is designed safely so that no errors occur beyond this time. Any errors occurring before this time can be detected by the error detection circuitry. Thus, the limits to the tuning are set so that no errors occur beyond this point. In this way, a system that is safe beyond the further output time is designed and this system has a better performance than a system that is designed to be safe at the output time.

In some embodiments, said tuning limiting circuit comprises a delay chain path for imitating a delay of a critical path of said processing stage and for providing a delay to a signal processed by said delay chain that is similar to but is longer than an estimated delay of said critical path, said output signal being a signal output by said delay chain and said tuning circuit being configured to adjust said at least one operational parameter until said comparator circuit detects an error through said delay chain path, and in response to detecting said error, not to adjust said at least one operational parameter beyond this point.

A delay chain path imitating a delay of a critical path can be used that is over margined so that it is longer than an estimated delay of the critical path but a signal passing along it is measured at the further output time. By over margining the critical path delay if the output signal at the end of the over margined critical path delay replica is stable at the end of the further output time, then one can assume that the output signal passing through the processing logic will also be stable at this point. As this point is the further output time tuning a system to this point will provide a system with better performance characteristics than tuning it to the output time, while allowing any signals that do not reach the output within the output time to be detected.

In some embodiments, said tuning circuit is configured to disable said tuning limiting circuit in response to detection of predetermined operating conditions and to enable said tuning limiting circuit in response to detection of other predetermined operating conditions.

The tuning circuit is only needed when the system is not executing critical code. When critical code is executed then the error rate will be at a certain level and the tuning circuit will set the limits in dependence upon this error rate. It is only when the error rate is very low that limits are needed to the settings for the operational parameters. Thus, in some embodiments, the tuning circuit may be disabled in response to certain operating conditions and enabled in response to others.

For example the operating conditions may be dependent upon a processing unit within the processing stage that contains the critical paths of the processing stage. Thus, if this processing unit is disabled it is known that no critical paths will be operational and as such the tuning limiting circuit needs to be enabled. However, when this processing unit is enabled then errors will occur and the tuning limiting circuit can be disabled as tuning will be limited by the error rate.

In some embodiments, said tuning circuit is configured to adjust said at least one operational parameter in response to errors signalled by said error detecting circuit, said tuning circuit being configured to adjust said operational parameters to achieve a preferred error rate within said tuning limits set by said tuning limiting circuit.

When the processing stage is executing critical code then there is a certain error rate produced and the tuning circuit acts as in a conventional razor circuit to tune the operational parameters in dependence upon this error rate. It is only when the error rate is low that the tuning limiting circuit is required.

In some embodiments, said processing stage is synchronous and said output time comprises an end of a clock cycle.

Although example embodiments are particularly applicable to synchronous circuits that are clocked, it will be clear to a skilled person that asynchronous circuits where operating parameters such as the operating voltage can be adjusted could also use the technology described in this application.

A second aspect provides a method of providing a tuning limit for operational parameters of a processing stage within a data processing apparatus said processing stage comprising: an input for receiving said signal, processing circuitry for processing said signal and an output for outputting said processed signal at an output time; an error detecting circuit for determining if a signal output by said processing stage between said output time and a predetermined time later does not have a stable value, said predetermined time later being before a next output time, and for signalling an error if said signal is not stable; said method comprising the steps of: adjusting at least one operational parameter of said processing stage; providing at least one tuning limit beyond which said adjusting step cannot adjust said at least one operational parameter, said tuning limiting being selected such that a signal passing along a critical path of said processing stage tuned to said tuning limit is estimated to reach said output of said processing stage at a preset time later than said output time, said preset time being less than said predetermined time.

A third aspect provides a processing stage within a data processing apparatus for processing a signal, said processing stage comprising: an input for receiving said signal, processing circuitry for processing said signal and an output for outputting said processed signal at an output time; an error detecting circuit for determining if a signal output by said processing stage between said output time and a predetermined time later does not have a stable value, said predetermined time later being before a next output time, and for signalling an error if said signal is not stable; a tuning circuit for adjusting at least one operational parameter of said processing stage; a tuning limiting circuit for providing at least one tuning limit for said tuning circuit, such that said at least one operational parameter is not adjusted beyond said corresponding at least one tuning limit, wherein said tuning limiting circuit comprises a delay chain path for imitating a delay of a critical path of said processing stage and for providing a delay to a signal to be processed by said delay chain that is similar to but is less than an estimated delay of a critical path within said processing stage, said tuning limiting circuit further comprising a comparator circuit for detecting a difference in an output from said delay chain at said output time and an output from said delay chain at said predetermined time later than said output time and in response to detecting a difference in said outputs, to set a tuning limit for said at least one operational parameter.

DESCRIPTION OF EXAMPLE EMBODIMENTS

Figure 1:
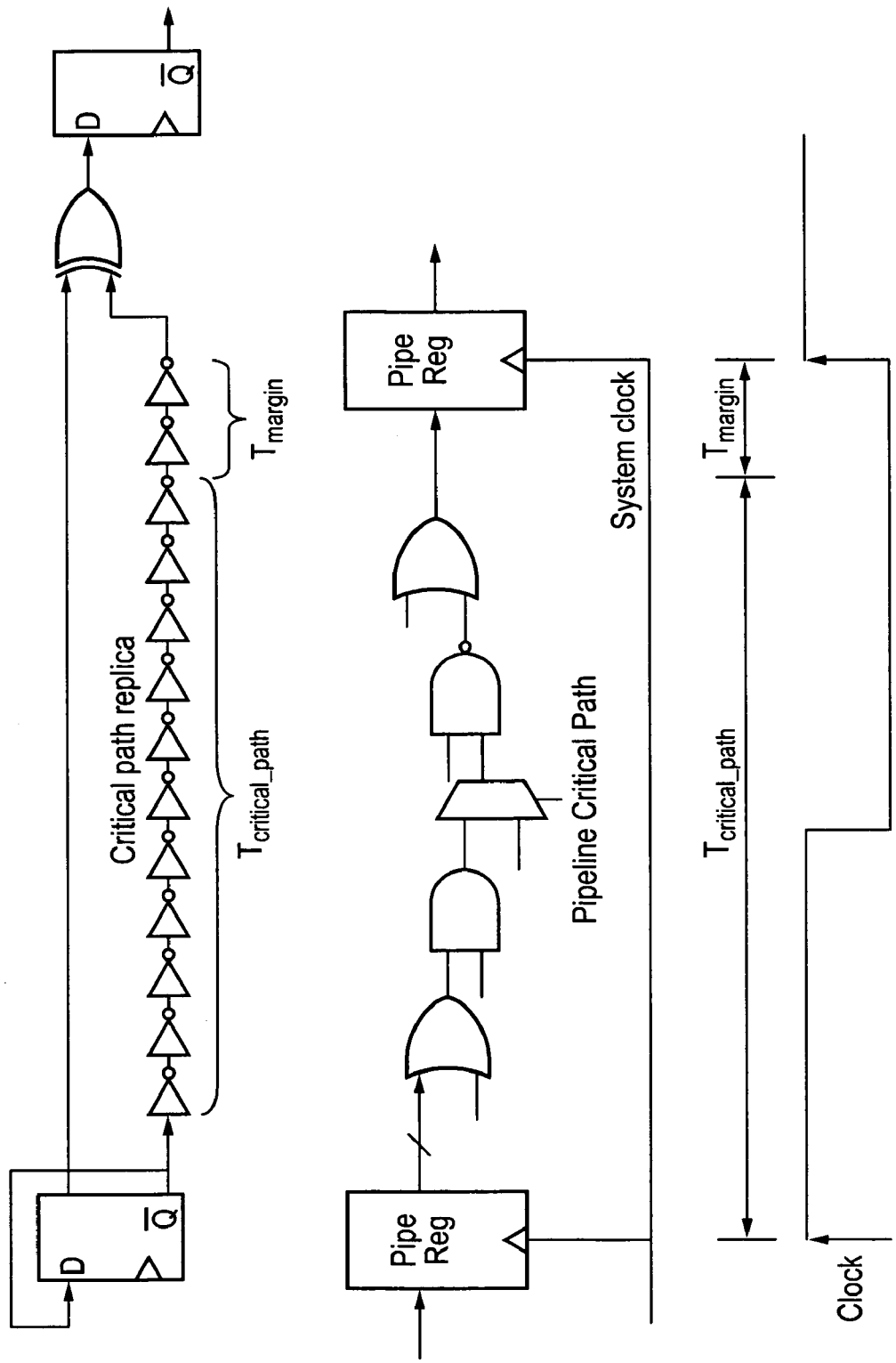
FIG. 1 shows a critical path delay replica circuit according to the prior art.
Figure 2:
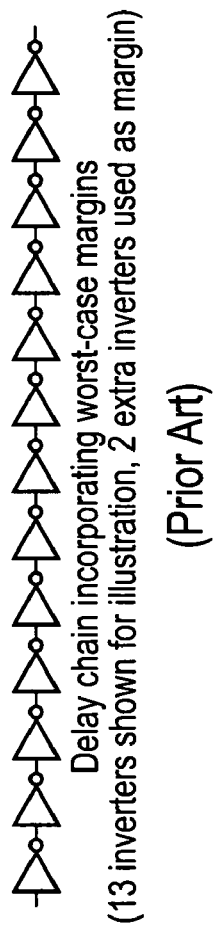
FIG. 2 shows critical path delay replica circuits according to the prior art and a non-limiting, example embodiment.
Figure 2:
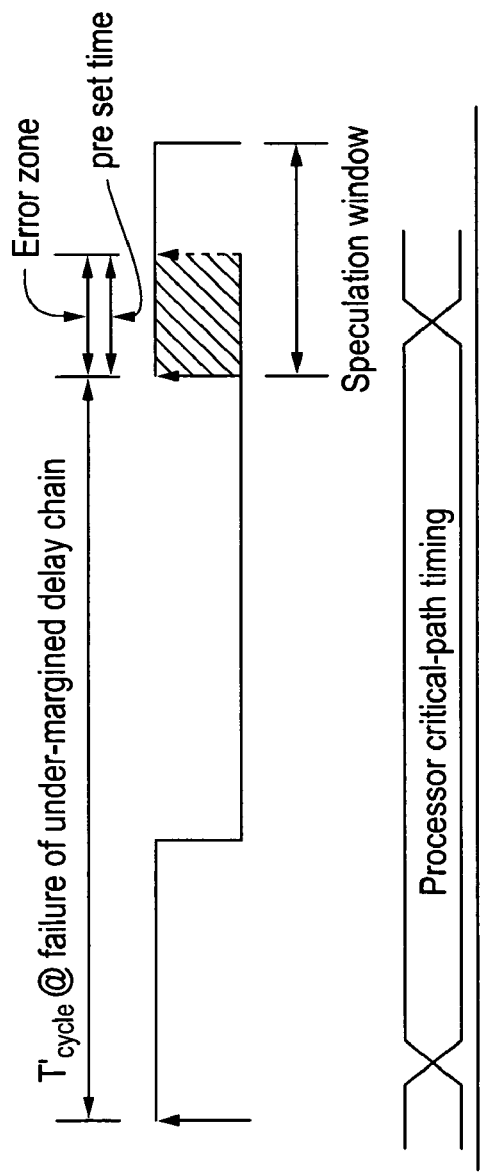

FIG. 2 shows different replica delay chains and a timing cycle for the delay chains along with the processor critical path timing. Non-limiting, example recognise that in systems where errors are detected in a speculation window and can be corrected, then tuning the operational voltage and/or clocking frequency to values beyond which timing errors may occur is not fatal as these errors can be detected and corrected. It realises that providing tuning limits that avoid errors in most situations but may produce them in some, may provide a system that is better tuned and can work at a more optimum point than conventional systems that are tuned to have safety margins to avoid the generation of any errors.

Thus, in the case of FIG. 2 it is calculated that the critical path delay of the system is equivalent to a Path of 11 inverters. Thus, if 11 inverters were used as a replica critical path delay to determine the tuning limits for frequency and/or operational voltage then owing to temperature and/or inter-die fluctuations the tuning limits selected may be such that at times there might be errors. Thus, conventionally a delay chain incorporating more than 11 inverters, perhaps 13 is used to make sure that the tuning of the system is within a safe region for all operations. Non-limiting, example embodiments by contrast deliberately choose a delay chain that is under margined, in this example a delay chain of 9 inverters is chosen. It is recognised that using such a delay chain to set limits may mean that errors may be created by some signals passing along some critical paths. However, it recognises that these errors will be few and as it has a system for detecting and recovering from these errors, these errors are acceptable and the advantage in being able to choose a system with a lower operational voltage and/or higher clocking speed outweighs the disadvantage of having to occasionally correct for errors. Thus, non-limiting, example embodiments produce a better tuned system. In this non-limiting, example embodiment, it is estimated that on average a signal passing along the delay chain when operating at the tuning limits will arrive at a preset time after the output time.

This is shown in the timing diagrams of the FIG. 2. The lower timing path shows the processor critical path timing of a typical die. The upper timing cycle shows the failure limit of the under margined 9 inverter delay chain. This timing limit is used to set the clocking frequency and thus, some signals passing along the processor critical timing paths will not reach the output within the cycle set by this delay chain. However, there is a speculation window provided by the system and provided the signal reaches the output within this period it can be corrected for.

As will be understood by the skilled person, the extent to which the critical path operates in the speculation window depends upon how much the delay chain is under margined by, on the particular die and on the ambient conditions during dynamic operation of the processor.

It should be noted that this scheme provides an approximate indication to the system of a tuning limit, when the error rates are low or even 0. When the error rates are higher then the system works with a conventional razor way of limiting the operational voltage and clocking frequency adjusting these in dependence upon an error frequency. This scheme simply limits the clocking frequency and/or operational voltage at low or zero error rate to a level such that when a critical path is again used the signal will not be outside the speculation window. Thus, when critical code is being executed the monitored error rate sets the tuning of the operational frequency and/or operational voltage and this automatically restricts scaling when high error rates are observed. It is only when these critical paths are not used that this scheme limits the tuning such that the frequency and/or voltage are not over tuned and when the critical paths are again used any errors are within the speculation region and can be recovered from.

Figure 3:
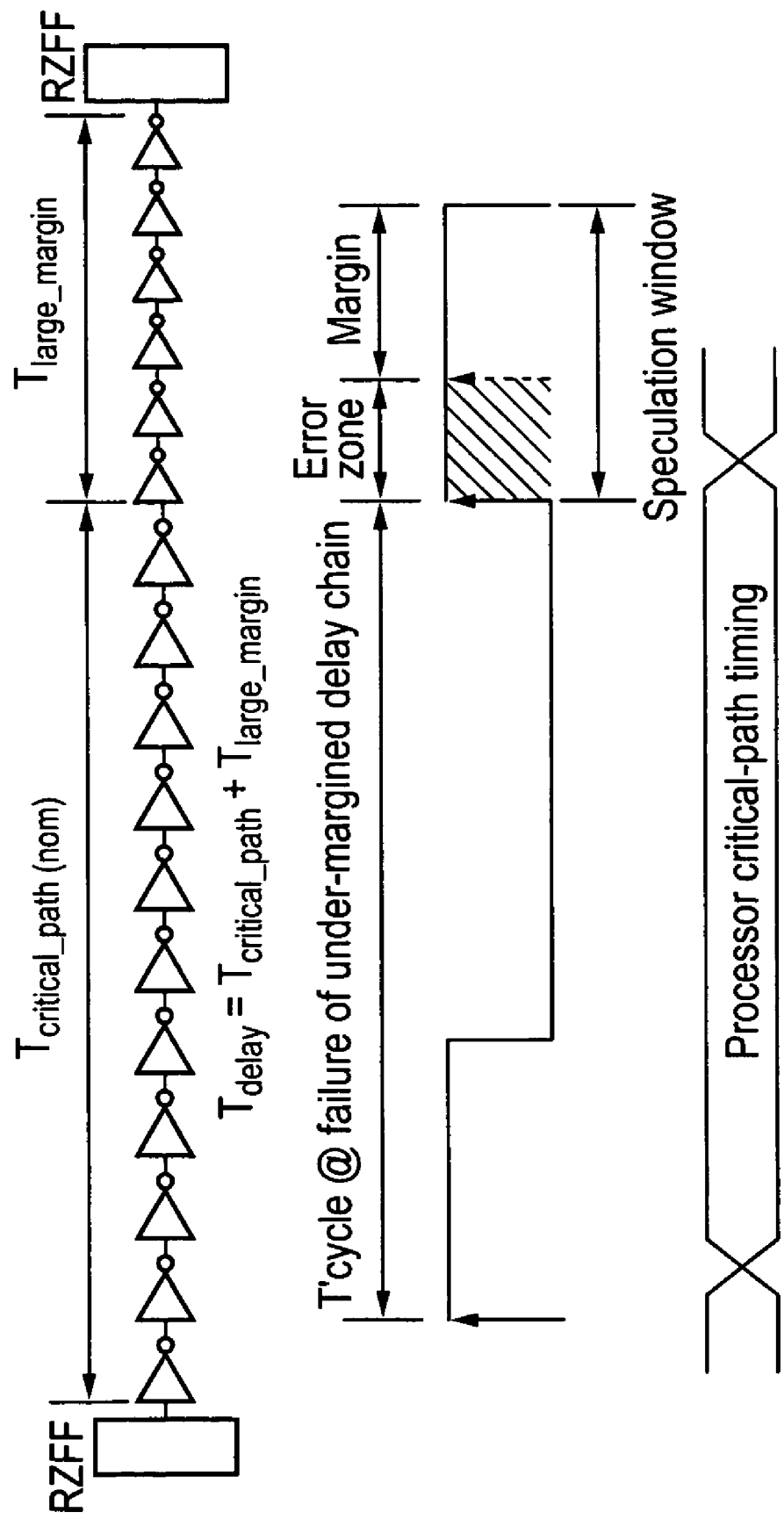
FIG. 3 shows a critical path delay replica circuit according to a non-limiting, example embodiment.

In the above embodiment an under margined delay chain is used, the timing of which is monitored at the end of the clock cycle. In an alternative embodiment, a similar concept is used but an over margined delay chain is used and the timing at the end of the speculation window is monitored. FIG. 3 shows an example of such a system. In this embodiment, a delay chain is used that has a significantly longer delay than the critical path. However, signals sent down it are not monitored at the end of the clock cycle rather they are monitored at the end of the speculation window. The system is then tuned so that if any signal takes longer to travel along this over margined delay path than the clock cycle plus the speculation window then the operational parameters are varied so that all signals arrive within this time scale again. As this imitation critical path delay is over margined, then if no signal that travels along this path arrives beyond the end of the speculation window, one can be sure that all signals travelling along the critical paths will arrive before the end of the speculation window and thus, operation is in a safe region where errors can be recovered from.

In this way, the system is tuned to a limit where errors may occur but they are errors that can be corrected. Thus, although an over margined delay chain has been used, the system is tuned to an under margined limit as the signal sent along the delay chain is measured at the end of the speculation window and this leads to performance improvements as it eliminates these excess margins from the end of the clock cycle.

Figure 4:
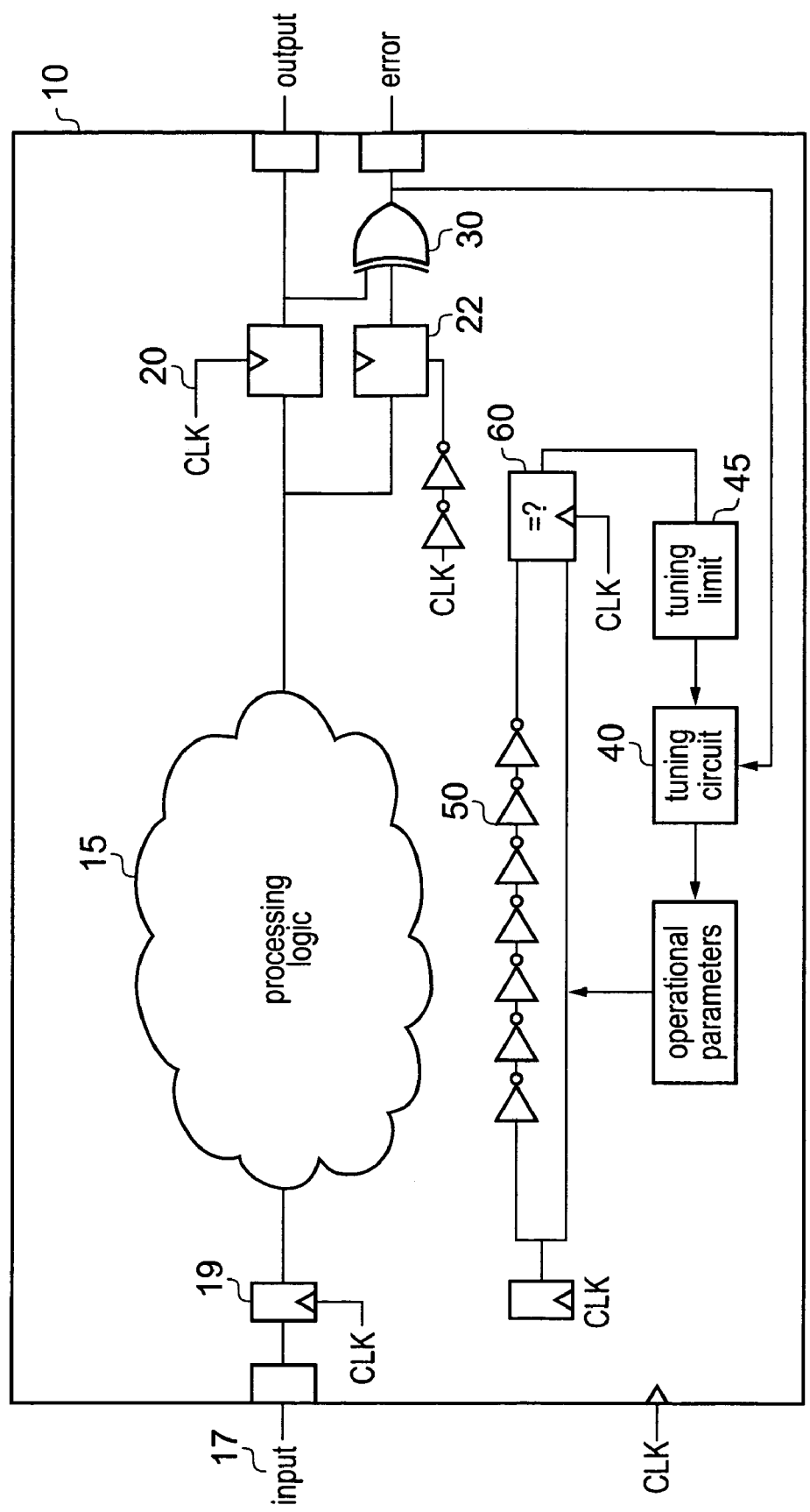
FIG. 4 shows a processing stage with a critical path delay replica circuit according to non-limiting, example embodiment.

FIG. 4 shows a processing stage 10 of a data processing apparatus according to a non-limiting, example embodiment. The processing stage 10 is shown schematically and comprises processing logic 15 for processing a signal received at an input 17. The signal is clocked into the processing stage via flip flop 19 and is then processed by processing logic 15. The signal output from the processing logic 15 is received at flip flop 20 and at error correcting and detecting or shadow flip flop 22. The shadow flip flop 22 is clocked by a clock with a delay with respect to the clock that clocked flip flop 20. A comparator 30 compares the signal held in flip flop 20 with that held in shadow flip flop 22. In this way, it detects whether the signal output at the clock cycle 20 is stable. If it has changed between the clock signal and the delayed clock signal then it wasn't stable and the comparator 30 detects this and flags an error. This error signal is then sent to tuning circuit 40 that tunes the operational parameters. The tuning circuit monitors the error rate and tunes the operational parameters accordingly. The error signal is also output to the next processing stage.

It will be clear to a skilled person that there could be a number of ways of detecting whether output signal from processing logic is stable at the end of the clock cycle and this is just one example.

The processing stage 10 further comprises a replica delay chain 50 that in this embodiment has 7 inverters and replicates a critical path delay of processing logic 15. It is a slightly under margined replica so that signals following a critical path within the processing logic may take slightly longer than signals along this replica delay chain. A signal is input to the replica delay chain and at the end of the clock cycle it is detected whether this signal has reached the end of the replica delay chain or not. If it has then this signal is input to the tuning limit circuit 45 and this indicates to tuning circuit 40 that the operational parameters are within safe limits and it can tune the circuit in dependence upon an error rate of the error signal output from comparator 30 in the usual way. If the signal from the delay chain is equal to the input signal then it is clear that it has not reached the end of the delay chain within the clocking period and a signal is sent to the tuning limit circuit 45 indicating that the system is now operating outside its tuning limits. In response to this signal, the tuning circuit 40 either stops further tuning and uses the operational parameters at this point or takes a step back and use the previous operational parameters that were current before this error signal was generated. The way it responds depends on the embodiment and on how under margined the delay chain.

In this way, the tuning circuit 40 is limited by tuning limit circuit 45 so that at times of low error rate it does not over tune the system, the tuning being limited to values that just cause or just avoid a signal reaching the end of the replica path in a clock cycle. This prevents the processing stage being tuned at low error rates to have operational parameters that are outside a safe window where errors that are generated cannot be detected or corrected.

Figure 5:
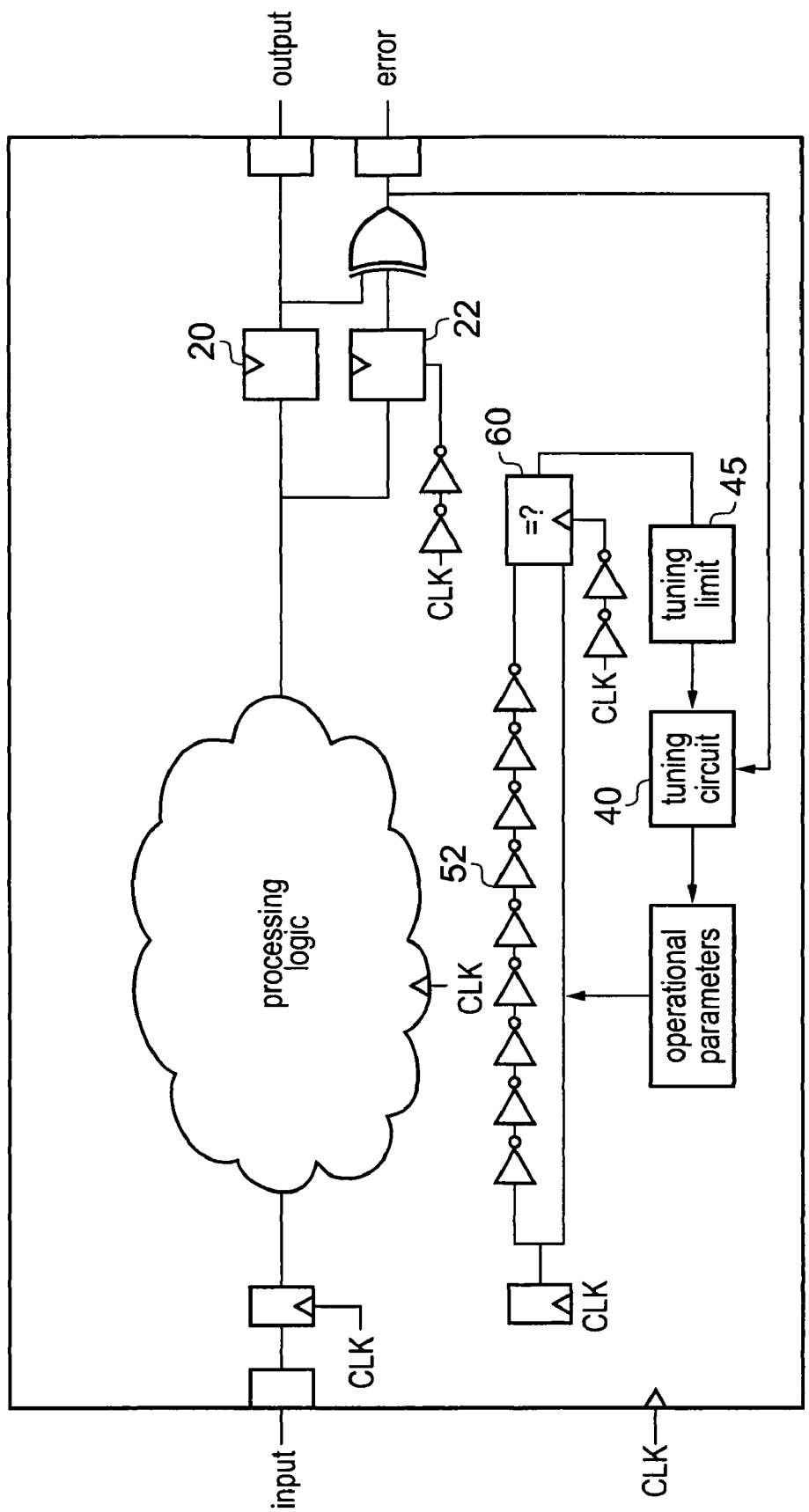
FIG. 5 shows a processing stage with a further critical path delay replica circuit according to a non-limiting, example embodiment.

FIG. 5 shows a similar embodiment but in this case the delay chain 52 is over margined and signals sent along this path are measured at the end of the speculation window rather than at the end of the clock cycle. Thus, comparator 60 is clocked by the delayed clock signal that clocks shadow latch 22 and determines the end of the speculation window. In this embodiment, the over margined delay chain is shown as having 9 inverters. It is clear that it could have different numbers depending on the length of the critical paths that it is replicating. In this embodiment, if the comparator circuit 60 detects that the input signal has not reached the end of the replica path within the delayed clock signal time it sends a signal to tuning limits circuit 45 which signals to tuning circuit 40 that it is acting outside of the required limits and the operational parameters are set accordingly. Thus, tuning is halted at this point and the operational parameters remain as they were. Alternatively, depending on how over margined the delay chain is it may be that at this point the system sets the operational parameters to what they were before an error was detected.

Figure 6:
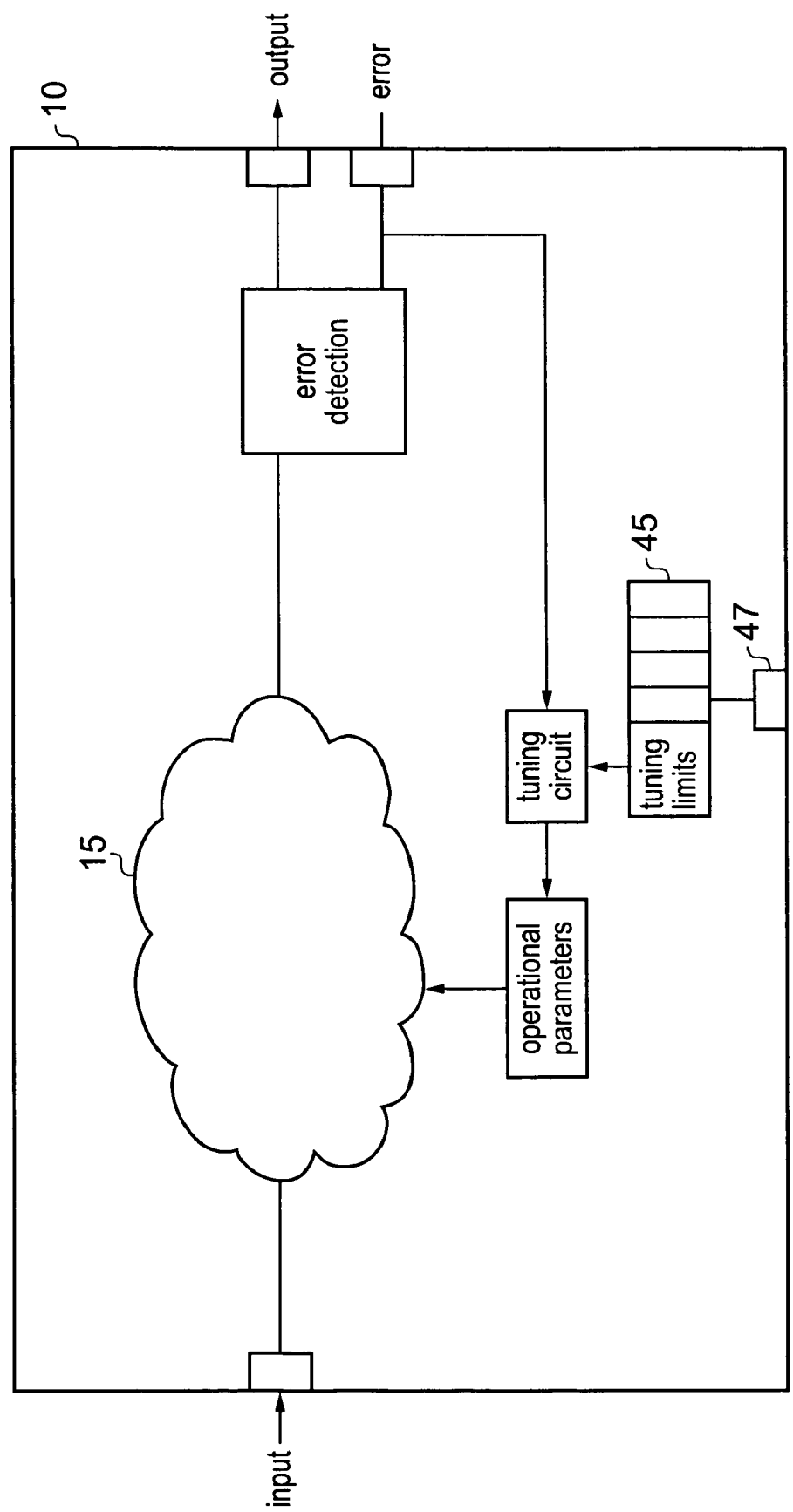
FIG. 6 shows a processing stage with stored tuning limits according to a non-limiting, example embodiment.

In the above described embodiments, the critical path delay is replicated using a delay chain. There are alternative ways of producing tuning limits and FIG. 6 shows such an alternative embodiment where tuning limits are stored in data storage cells within tuning limit circuitry 45. These limit values may be input by a programmer via input 47 or they may be hard wired at manufacture. Alternatively, they can be both hard wired and have an input so that they can be overwritten if the hard wired value is not the optimum value. In this embodiment, rather than replicating the critical path with delay chains, the length of the critical path is determined by perhaps static analysis and then the appropriate under margined values are entered into the tuning limits circuit. In this embodiment, tuning circuit 40 is limited by the values stored in tuning limiting circuit 45 and thus, it does not tune the operational parameters beyond the values specified in the registers in tuning limiting circuit 45.

Figure 7:
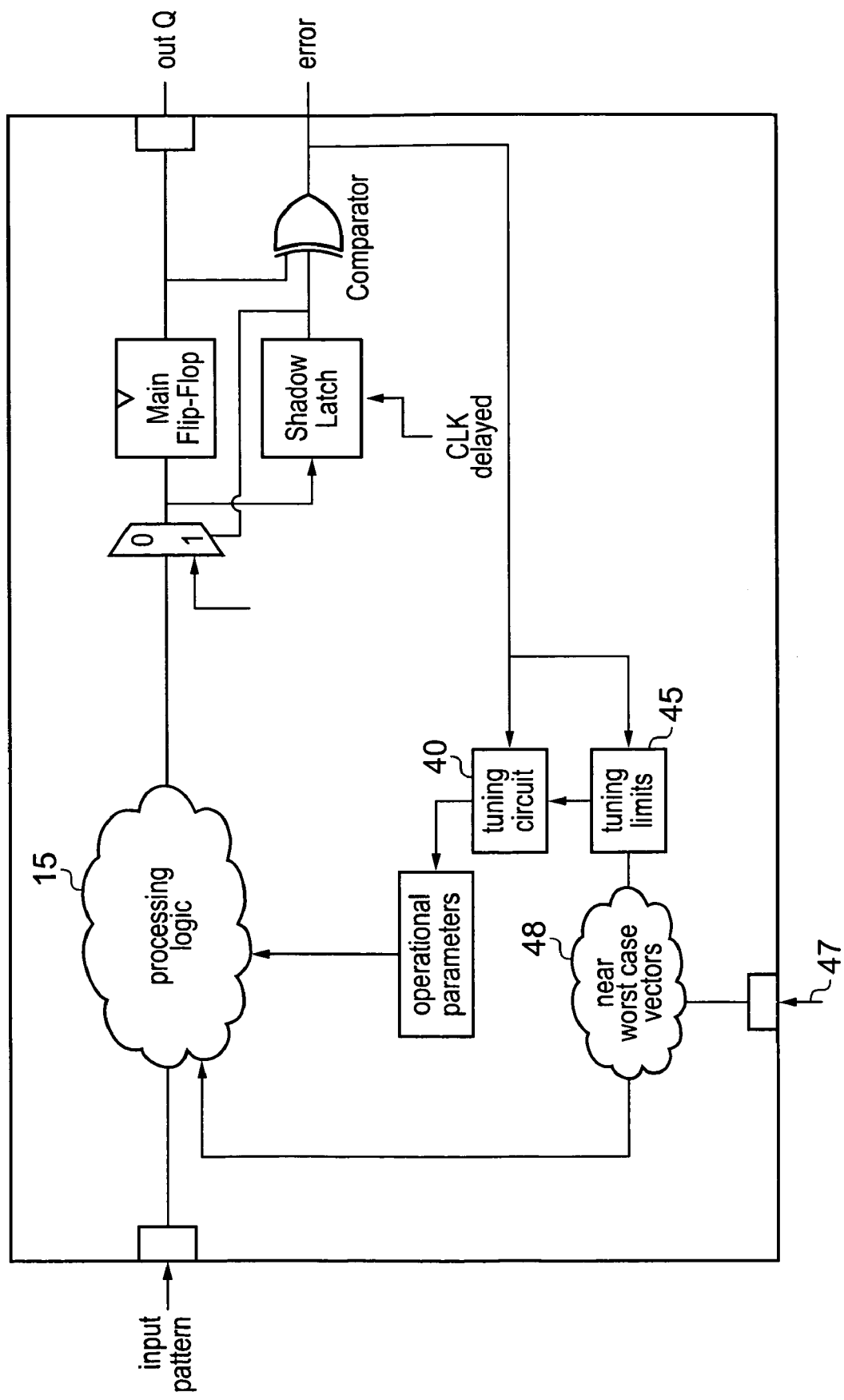
FIG. 7 shows a processing stage with near worst case vector generating circuitry according to a non-limiting, example embodiment.

In an alternative embodiment shown in FIG. 7 the tuning limits are determined by near worst case vectors that are sent through the processing logic. This may be done by the tuning limiting circuit receiving instructions from a programmer that are input via input 47 or that are stored as a test program in logic 48 and which cause the near critical paths in the processing logic 15 to be active. In such a case, the delays for these near worst case vectors to pass through the processing logic are monitored and the tuning limits are set to a value that enables these signals to arrive at the output within the clock cycle. As it is the paths that are similar to but slightly better than critical paths that are tested a tuning limit that is under margined is achieved. Thus, when critical code is not being executed the tuning circuit will be limited by these values. When critical code is executed errors may occur but they will be detected as they will still be within the speculation window and the system will be tuned appropriately.

In some embodiments rather than inputting code via input 47 an input pattern may be input via input 47. This input pattern triggers the near critical paths to be active and thus, the delays determined in this way can be used by tuning limiting circuit 45 to set the operational parameters to a value where the critical paths will just generate errors. It should be noted that although in this embodiment near critical paths are activated to provide tuning limits which are under margined, in other embodiments the critical paths themselves could be activated and tuning limits with a slightly higher frequency and/or lower voltage than those that triggered the first errors selected as the tuning limits.

Figure 8:
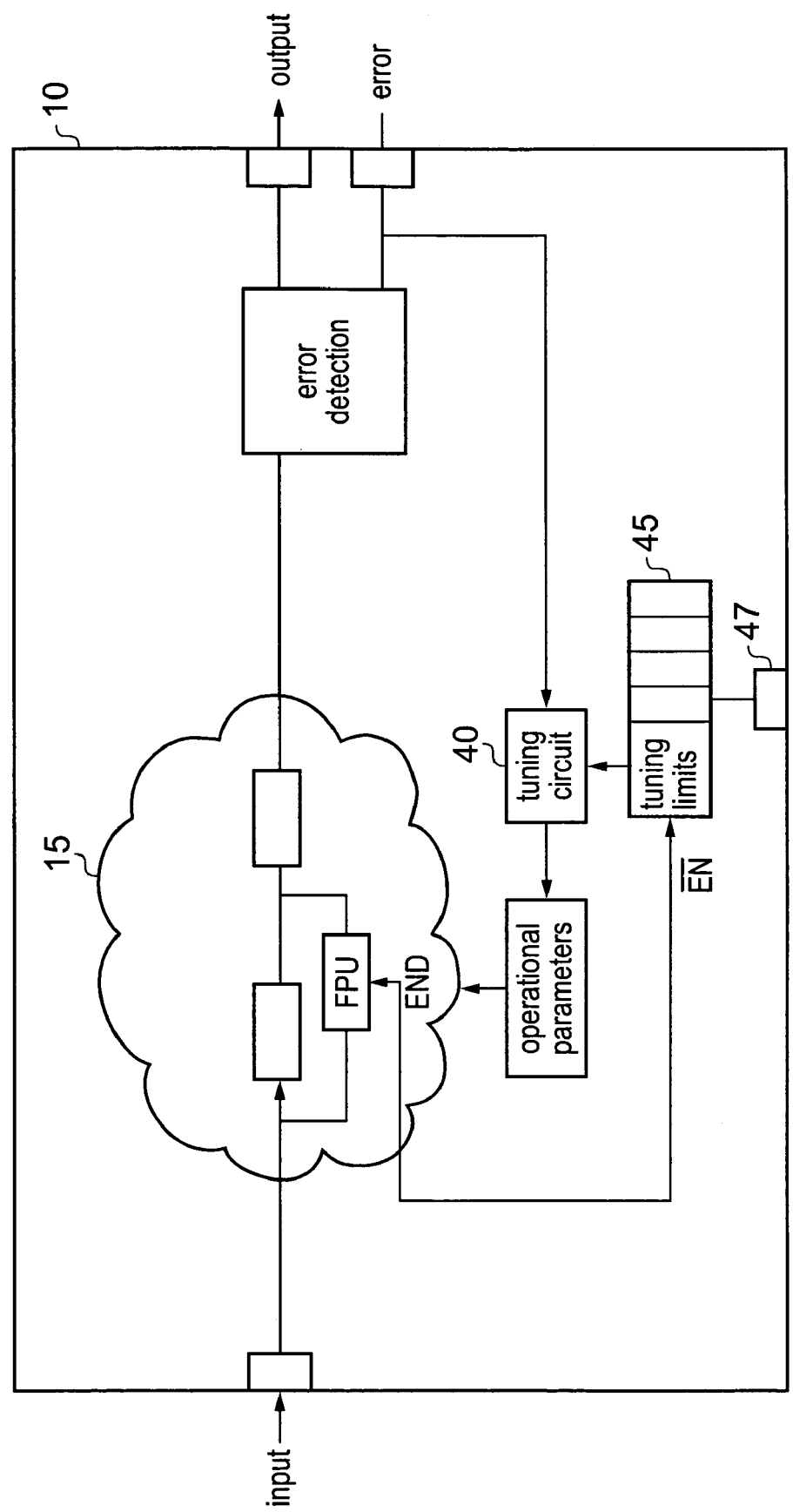
FIG. 8 shows a processing stage according to a non-limiting, example embodiment.

FIG. 8, shows the embodiment of FIG. 6, with the additional provision of an enable signal to turn the tuning limit circuit 45 on or off. In this embodiment this enable signal is linked to the floating point unit within processing logic 15. This unit contains the critical paths of the processing logic, and thus, when it is enabled and operational the processing stage can be tuned using error rate analysis within tuning circuit 40 and the tuning limit circuit 45 is not required. Thus, this circuit is enabled with an inverse enable signal that enables the floating point unit, so that when the floating point unit is enabled the tuning limit circuit 45 is not enabled, and when the floating point unit is not enabled the tuning limit circuit 45 is enabled. In this way further power savings can be made, by only having this circuit operational when it may be required.

It should be noted that although in the above embodiments synchronous processing stages have been described, it would be clear to a skilled person that these stages can be asynchronous, with rather than a clock signal indicating when a signal should be input and output from the stage, a different asynchronous control signal perhaps generated by a delay path could be used. This signal would also be used instead of the clock signal shown in the embodiments to switch the various flip flops.

Figure 9:
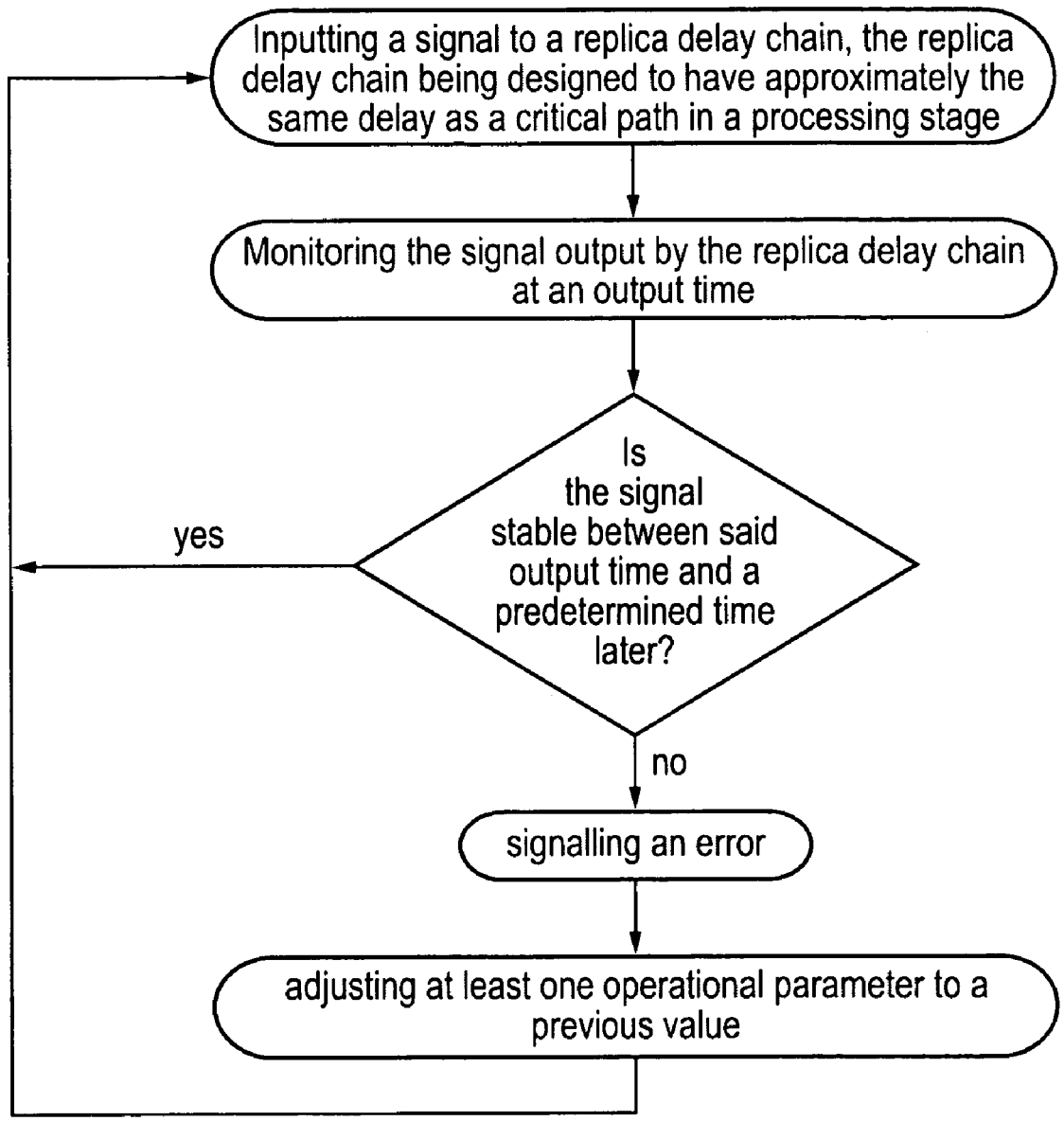
FIG. 9 is a flow diagram illustrating a method of limiting the tuning parameters of a circuit according to a non-limiting, example embodiment.

FIG. 9 shows a flow diagram illustrating a method of setting tuning limits for operational parameters of a processing apparatus. Initially a signal is input into a replica delay chain. The replica delay chain is designed to have approximately the same or a lower delay than a critical path in a processing stage, such that for some processing stages this replica path will have a shorter delay than the critical path, i.e. it is not over margined. The signal output by the replica delay chain is monitored to see if it is stable at an output time. The output time generally corresponds to a clock period of a clock clocking the processing apparatus. If it is stable, then the operational parameters are within suitable limits, however, if it is not stable then they are outside of these limits in that the signal is not passing along the replica delay path within a clock cycle. In response to detecting this, the operational parameters are adjusted to a previous acceptable value. In some embodiments, rather than adjusting the operational parameters to a previous value, they are limited to the current value, which of the two occurs depends on how under margined the delay chain is.

It should be noted that the signal input to the replica delay chain may be input at the start of operation of the device to set limits initially or it may be sent continually or periodically, for example in response to changes in operational conditions.

Although non-limiting, example embodiments have been described in detail herein with reference to the accompanying drawings, it is to be understood that the claims are not limited to those embodiments, and that various changes and modifications can be effected therein by one skilled in the art without departing from the scope and spirit of the appended claims.

We claim:

1. A processing stage within a data processing apparatus for processing a signal, said processing stage comprising:
    an input for receiving said signal, processing circuitry for processing said signal and an output for outputting said processed signal at an output time;
    an error detecting circuit for determining if a signal output by said processing stage between said output time and a predetermined time later does not have a stable value, said predetermined time later being before a next output time, and for signalling an error if said signal is not stable;
    a tuning circuit for adjusting at least one operational parameter of said processing stage, said at least one operational parameter comprising at least one of an operating voltage of said processing stage and an operating frequency of a clock clocking said processing stage;
    a tuning limiting circuit for providing at least one tuning limit for said tuning circuit to prevent said at least one operational parameter being adjusted beyond said corresponding at least one tuning limit,
    wherein when said processing stage is tuned to said tuning limit, a signal passing along a critical path of said processing stage is expected to reach said output of said processing stage at a preset time later than said output time, said preset time being less than said predetermined time.

2. A processing stage according to claim 1, wherein said corresponding tuning limits comprise a lowest limit value for said operating voltage and a highest limit value for said operating frequency.

3. A processing stage according to claim 1, wherein said tuning limiting circuit comprises a delay chain path for imitating a delay of a critical path of said processing stage and for providing a delay to a signal to be processed by said delay chain that is similar to but is less than an expected delay of said critical path, said tuning limiting circuit further comprising a comparator circuit for detecting a difference in an output from said delay chain at said output time and an output from said delay chain at said predetermined time later than said output time and in response to detecting a difference in said outputs, to set a tuning limit for said at least one operational parameter.

4. A processing stage according to claim 3, wherein in response to detecting said output difference said tuning circuit is configured to set a current value of said at least one operational parameter as said at least one tuning limit.

5. A processing stage according to claim 3, wherein in response to detecting said output difference said tuning circuit is configured to adjust said at least one operational parameter to a value that said at least one operational parameter had before said difference was detected and to set said at least one operational parameter as said at least one tuning limit.

6. A processing stage according to claim 1, wherein said tuning limiting circuit comprises a register for storing said at least one tuning limit and an input for receiving said at least one tuning limit.

7. A processing stage according to claim 1, said tuning limiting circuit further comprising an input for receiving a test program and circuitry for sending said test program to said processing circuitry, processing of said test program causing said signal to pass along a near critical path, said tuning circuit being configured to adjust said at least one operational parameter until said error detecting circuit detects an error, said at least one tuning limit of said at least one operational parameter being set to a value of said at least one operational parameter at a point that an error is detected.

8. A processing stage according to claim 1, said tuning limiting circuit further comprising a test input for receiving a test pattern and circuitry for transmitting said test pattern to said processing circuitry, said test pattern causing said signal to pass along a near critical path, said tuning circuit being configured to adjust said at least one operational parameter until said error detecting circuit detects an error, said at least one tuning limit of said at least one operational parameter being set to a value of said at least one operational parameter at a point that an error is detected.

9. A processing stage according to claim 1, wherein said tuning limiting circuit comprises a comparator circuit for comparing an output signal at said predetermined time later than said output time with an output signal at a later time than said predetermined time and before a next output time, and for signalling a difference if said two signals are not equal,
    said tuning limiting circuit being configured to select said at least one tuning limit to ensure that all of said signals processed by said processing stage will have said stable value at said predetermined time.

10. A processing stage according to claim 9, wherein said tuning limiting circuit comprises a delay chain path for imitating a delay of a critical path of said processing stage and for providing a delay to a signal processed by said delay chain that is similar to but is longer than an expected delay of said critical path, said output signal being a signal output by said delay chain and said tuning circuit being configured to adjust said at least one operational parameter until said comparator circuit detects an error through said delay chain path, and in response to detecting said error, not to adjust said at least one operational parameter further.

11. A processing stage according to claim 1, wherein said tuning circuit is configured to disable said tuning limiting circuit in response to detection of predetermined operating conditions and to enable said tuning limiting circuit in response to detection of other predetermined operating conditions.

12. A processing stage according to claim 11, wherein said predetermined operating condition is dependent upon a processing unit within said processing stage being disabled, said processing unit comprising a critical path and said other predetermined operating condition being said processing unit being enabled.

13. A processing stage according to claim 1, wherein said tuning circuit is configured to adjust said at least one operational parameter in response to errors signalled by said error detecting circuit, said tuning circuit being configured to adjust said operational parameters to achieve a preferred error rate within said tuning limits set by said tuning limiting circuit.

14. A processing stage according to claim 1, wherein said processing stage is synchronous and said output time comprises an end of a clock cycle.

15. A method of providing at least one tuning limit for at least one operational parameter of a processing stage within a data processing apparatus, said processing stage including an input for receiving a signal, processing circuitry for processing said signal, an output for outputting said processed signal at an output time, and an error detecting circuit for determining if a signal output by said processing stage between said output time and a predetermined time later does not have a stable value, said predetermined time later being before a next output time, and for signalling an error if said signal is not stable, said method comprising the steps of:
adjusting at least one operational parameter of said processing stage; and
providing at least one tuning limit beyond which said adjusting step cannot adjust said at least one operational parameter, said at least one operational parameter comprises at least one of an operating voltage of said processing stage and an operating frequency of a clock clocking said processing stage,
wherein when said processing stage is tuned to said tuning limit, a signal passing along a critical path of said processing stage is expected to reach said output of said processing stage at a preset time later than said output time, said preset time being less than said predetermined time.

16. A processing stage within a data processing apparatus for processing a signal, said processing stage comprising:
an input for receiving said signal, processing circuitry for processing said signal, and an output for outputting a processed signal at an output time;
an error detecting circuit for determining if a signal output by said processing stage between said output time and a predetermined time later does not have a stable value, said predetermined time later being before a next output time, and for signalling an error if said signal is not stable;
a tuning circuit for adjusting at least one operational parameter of said processing stage, said at least one operational parameter comprises at least one of an operating voltage of said processing stage and an operating frequency of a clock clocking said processing stage;
a tuning limiting circuit for providing at least one tuning limit for said tuning circuit to prevent said at least one operational parameter being adjusted beyond said corresponding at least one tuning limit,
wherein said tuning limiting circuit comprises a delay chain path for imitating a delay of a critical path of said processing stage and for providing a delay to a signal to be processed by said delay chain that is similar to but is less than an expected delay of a critical path within said processing stage,
said tuning limiting circuit further comprising a comparator circuit for detecting a difference in an output from said delay chain at said output time and an output from said delay chain at said predetermined time later than said output time and in response to detecting a difference in said outputs, to set a tuning limit for said at least one operational parameter.

\* \* \* \* \*